Sept. 8, 1931.  A. F. PLINT  1,821,986
PULSATOR FOR MILKING MACHINES
Filed Oct. 23, 1929
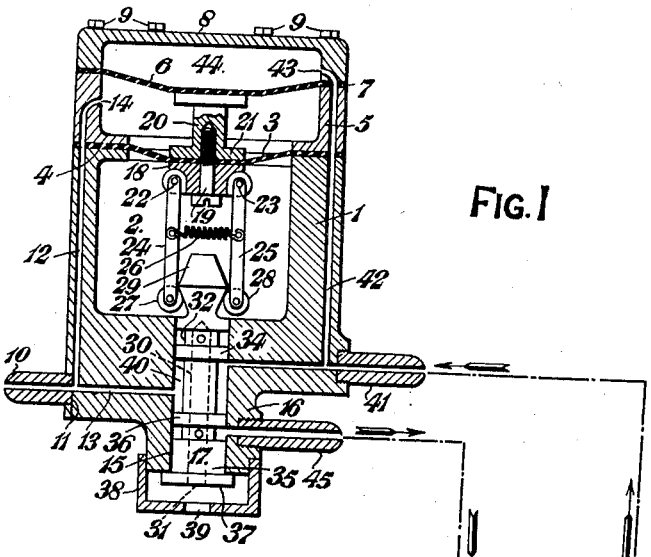
Inventor
A. F. PLINT.
Per Sydney Page
Attorney Patented Sept. 8, 1931

1,821,986

UNITED STATES PATENT OFFICE

ALEXANDER FREDERICK PLINT, HENLEY-ON-THAMES, ENGLAND, ASSIGNOR TO STUART TURNER LIMITED, OF HENLEY-ON-THAMES, OXFORD, ENGLAND

PULSATOR FOR MILKING MACHINES

Application filed October 23, 1929, Serial No. 401,675, and in Great Britain October 29, 1928.

This invention relates to pulsators for milking machines, and has more especial reference to pulsators operating in association with a source of suction.

The main object of the present invention is to provide a pulsator which will be unaffected by changes in temperature and to simplify its construction by reducing the number of working parts so as to avoid friction and remove the necessity for adjustment, whereby the pulsator may function over long periods without requiring overhaul, and a second object is to provide for a steady and even pulsation throughout the operation.

Further and favourable objects will appear from the following description.

In accordance with the invention a pulsator for milking machines comprises a pair of diaphragms of different superficial areas located in a casing, the smaller being open at one side to atmosphere, suction conduits in said casing, one leading to a closed space between said diaphragms and maintaining it evacuated, and the second conduit communicating with a closed space between the larger diaphragm and the casing and a valve connected to said diaphragms and controlled by their position to open said second space to atmosphere through said second conduit or to exhaust said space therethrough, whereby such space is intermittently evacuated on a suction being applied and pulsations of the diaphragms result.

The pulsation of the diaphragms effects oscillation of the valve, and preferably also alternates the suction between two conduits connected with the teat cups associated with the milk pipes with the result that the intermittent suction required for the milking operation is produced.

In a preferred form of pulsator according to the invention the casing contains a pair of diaphragms of different superficial area dividing it into three spaces, the middle and closed space being always connected to the source of suction or exhauster which maintains a partial vacuum therein and a second closed space between the larger diaphragm and the casing being connected alternately to atmosphere and to said exhauster by means of the valve aforementioned, and the third space adjacent the smaller diaphragm being open always to atmosphere.

A suitable distance piece is interposed between the two diaphragms and a head is provided on the smaller diaphragm with which are associated a system of levers transmitting the pulsations of the diaphragms to the control valve, which conveniently reciprocates in a cylindrical seating situated preferably in the bottom of the pulsator casing, the distributor ports from the exhauster or other source of suction to said spaces and to the teat cups branching from this seating.

The casing may conveniently be made of metal and the diaphragms of rubber, rubberized fabric, flexible metal or other air-proof material, all connections of the pulsator being made air-tight and suitable packing employed where necessary.

The invention will be further described with reference to the accompanying explanatory drawings where two embodiments of pulsator according to the invention are illustrated by way of example, and where:

Fig. 1 is a vertical section of one form of pulsator with the control valve in the upper position;

Fig. 2 is a detail section of the lower portion of the pulsator with the control valve in its lower position;

Fig. 3 shows a pair of teat cups in section and side elevation respectively for connection to the pulsator illustrated in the preceding figures; and Fig. 4 is a vertical section of a modified construction.

Referring now to the drawings, but first more particularly to Figs. 1 and 2, 1 is a cylindrical casing formed, say, of cast iron or other suitable material, having a substantially circular interior cavity 2 surmounted by a diaphragm 3 of light air-proof material such as rubberized fabric secured at its periphery 4 to the casing 1 by an annular collar 5 so as to make an air-tight joint therewith, a second larger diaphragm 6 surmounting said annular collar 5 and in turn having its periphery 7 secured to said annular collar in an air-tight fashion by a flanged head 8, the head 8, the diaphragm 6, collar 5, diaphragm 3 and casing 1 being arranged to be secured and maintained as a unit by a series of stud bolts 9 arranged peripherally in the head 8 and projecting downwardly into the walls of the casing 1.

A suction supply pipe 10 from a suitable source of suction (not shown) connects with the casing 1 at 11 and branches into two conduits 12 and 13, the conduit 12 passing upwards through the wall of the casing 1 and opening through the interior of the annular collar 5 at 14 into the space between the diaphragms 3 and 6.

The conduit 13 leads to a cylindrical valve seating 15 arranged in a solid portion 16 provided at the lower end of the casing 1, and in which a valve 17, hereafter more fully described, is located.

Secured to the lower and smaller diaphragm 3 on its underside is a small head 18, a bolt 19 passing from said head through the diaphragm 3 into a dumb-bell connection 20 which serves simultaneously for mounting the head 18 and as a distance piece between the lower diaphragm 3 and the upper diaphragm 6. As will be seen the head 18 must be secured to the diaphragm 3 at 21 with an air-tight joint.

Pivoted to the head 18 at 22 and 23 respectively are a pair of levers 24 and 25, which depend downwardly and across which a tension spring 26 is located, the free lower ends of the levers having rollers 27 and 28 respectively engaging the head 29 of the valve 17 already mentioned.

The valve 17 has a central bore 30 opening to atmosphere at its lower end 31 and to two annular cavities 32 and 33 formed, the first between the head 29 and a peripheral flange 34 on the valve 17, and the second between a guide 35 and a peripheral flange 36 on said valve, the guide 35 having an enlarged sole 37 which constitutes a stop limiting the travel of the valve 17 by coming into abutment with the lower face of the casing 1 at the limit of its upward travel and with a cap 38 secured thereto at the limit of its downward travel, the cap 38 being perforated on its underside at 39 to permit of the central bore 30 of the valve 17 opening to atmosphere.

Between the flanges 34 and 36 is a further annular cavity 40 which in Fig. 1 connects the suction conduit 13 with conduits 41 and 42 oppositely disposed within the casing 1, the conduit 42 leading upwardly through the casing wall and opening at 43 into the space 44 between the upper and larger diaphragm 6 and the head 8 of the pulsator.

As will be seen in the position shown in Fig. 1 the valve 17 is in its upper position, and so the conduit 13 as just described connects with the conduits 41 and 42 in which event the suction is applied to the space 44, while in the position shown in Fig. 2 with the valve in its lower position, the conduit 13 is through the annular cavity 40 thrown into connection with a lower conduit 45.

In the upper position of the valve 17 the conduit 45 is open to atmosphere through the bore 30 of the valve, and in the lower position of the valve the conduits 41 and 42 are open to atmosphere, the arrangement being such that when the conduit 45 is open to atmosphere the conduits 41 and 42 are subjected to suction and vice versa.

The head 29 of the valve 17 is arranged in the form of a double cone, the bases of the cones being contiguous at 46 and the cross-sectional area of the head 29 diminishing on each side of 46 to provide what are in fact cam surfaces 47 and 48 for the rollers 27 and 28 aforementioned.

It will be readily understood that under the action of the tension spring 26 when the rollers bear on the lower cam surface 48 the valve 17 is induced to rise and keep its upper position as shown in Fig. 1, while when the rollers 27 and 28 occupy the upper cam surface 47 the valve 17 is induced downwardly and occupies its lower position as illustrated in Fig. 2; the vertical movement of the rollers is effected by the oscillation of the head 18 as a result of pulsations in the diaphragms.

The conduits 41 and 45 are arranged to be connected through suitable pipes, indicated by the dot and pick lines in the drawings, to the teat cups shown in Fig. 3, each comprising a rubber sleeve 49 which terminates a a milk pipe 50, and which is surrounded by a cup-like member 51 preferably of rigid material, such as vulcanite or metal, the leads from the conduits 41 and 45 passing to the cups 51 and opening thereinto at 52.

In operation a suitable source of suction is connected to the suction supply pipe 10, and the interior 2 of the casing 1 being opened to atmosphere, say through an aperture in the wall, the pulsator functions as follows.

In the position of the valve 17 shown in Fig. 1, the suction is conveyed through the conduit 13 and the annular cavity 40 to the conduits 41 and 42, the suction in the conduit 42 exhausting the space 44, and the space between the two diaphragms 3 and 6 being permanently exhausted by the constant suction applied through the conduit 12, the upper diaphragm 6 is in a state of equilibrium with the pressures on each side balanced, while the diaphragm 3, is, under the action of the atmospheric pressure prevailing in the space 2, induced to move upwardly carrying with it the upper diaphragm and the lever 24 and 25 with the consequence that the rollers 27 and 28 clear the peak 46 of the valve head and bearing on the cam surface 47 induce a downward movement of the valve so that it is caused to occupy the position shown in Fig. 2.

In this condition the suction conduit 13 is cut off from the conduit 42 which through the bore 30 of the valve 17 communicates with atmosphere, and as a result the pressures in the spaces 44 and 2 are balanced at atmospheric, but as the area of the diaphragm 6 is greater than that of the diaphragm 3 the actual pressure thereon is greater and results in a downward movement of the diaphragm 6 overcoming the resistance of the diaphragm 3 so that the diaphragms assume their original position as shown in Fig. 1, and the rollers ride over the peak 46 and bearing on the cam surface 48 return the valve 17 upwards again to the position shown in Fig. 1.

These operations are repeated, and so long as suction is applied to the pipe 10 with consequentially intermittent and alternate suction prevailing in the conduits 41 and 45 passing to the teat cups, an alternate collapse and expanse of the latter results and a flow of milk down the pipes 50—which are themselves subjected to suction—is produced.

The speed of operation can be adjusted by varying the bore of the conduit 42 or alternatively by providing a suitable valve therein.

Referring now to the modified construction of pulsator illustrated in Fig. 4, where in place of the cylindrical valve 17 a slide valve 53 is employed, a cylindrical casing 54 is arranged with an air space 55, at the head of which is located a diaphragm 56 mounted in a circular seating 57 of the casing and secured in position by an annular ring 58 beneath a second and larger diaphragm 59 secured peripherally at 60 by a flanged head piece 61, so that a closed space 62 is provided between the larger diaphragm 59 and the head piece 61.

63 is a suction supply pipe from which a conduit 64 opens into the space between the two diaphragms at 65 and maintains this space permanently exhausted, and a second conduit 66 in a slotted portion 67 of the casing leads to the distributing valve 53 sliding in a seating 68 operated by the pulsation of the diaphragms to distribute the suction to conduits associated with the teat cups.

A head piece 69 secured to the lower diaphragm 56 by a bolt 70 maintains the diaphragms rigidly spaced, and attached to said head piece 69 is a link 71, the other end of which is pivoted to a rocking lever 72 provided with a spring 73 maintaining a roller 74 at its free end in abutment with the cam surface 75 of the valve 53. The rocking lever 72 is mounted in a bearing 76, say of bronze, shown screwed to the casing and having a conical bushing 77 for the rocking lever 72 so that the latter is permitted to oscillate vertically consequent on pulsations of the diaphragms, the motion being transmitted from the diaphragms to the lever 72 through the link 71.

A collar 78 serves as an abutment for the springs 73 the other end of which bears on the bushing 76 so that the roller 74 is maintained on the cam surface 75 of the distributing valve.

The valve 53 has a port 79 which in the upper position of the valve as shown in the figure, communicates the distributing conduit 66 with the conduit 80 with a further conduit 81 which opening at 82 into the closed space 62 between the upper diaphragm 59 and the head 61 causes the evacuation of this space.

In the lower position of the valve the port 79 throws the distributing conduit 66 into communication with the conduit 83 and the valve 53 is arranged as in the previous embodiment to serve a dual purpose of intermittently effecting exhaustion of the closed space 62 to effect pulsation of the diaphragms and consequent thereon to transmit intermittent and alternate pulsations to the conduits 80 and 83 connected to the teat cups.

To this end the cam surface 75 of the valve is provided with declivities 84 and 85, on each of which the roller 74 bears, and it will be seen when the roller bears on the lower declivity 85 the valve is forced upwardly to the position shown, causing the space 62 to be exhausted and the diaphragms to be moved upwardly as described in the previous embodiment, with the result that the roller 74 is caused to bear on the upper declivity 84 of the valve which is as a consequence moved to its lowermost position the operation being repeated as described in connection with the preferred embodiment, and pulsations of the diaphragms in the conduits 80 and 83 being thereby produced.

It will be understood that a milking operation by intermittent and alternate suction applied to the teat cups 51, does not form part of the invention, being previously known, but that the invention is comprised in the novel arrangement of parts and the working thereof to form the pulsator for use in such milking operation, or in any other milking operation, for instance with a single suction conduit applied to the four teat cups, when the conduit 41 or 80 would be omitted and the valve 17 or 53 in its upper position would simply communicate with the closed space 44 or 62, the conduit 45 or 83 in this case communicating with all four teat cups, and an intermittent suction be applied thereto to effect the milking operations as a result of pulsations in the diaphragm.

As will be seen the pulsators constructed in accordance with the invention have a minimum of movable parts and are capable of continued operation over long periods without overhaul, while maintaining a uniform pulsation enhancing the efficiency of the milking operation, the speed of working being insensitive to and unaffected by variations in the degree of vacuum applied.

What I claim is:

1. A pulsator for milking machines comprising a pair of rigidly spaced diaphragms of different superficial area located in a casing, the smaller being open to atmosphere at one side, a suction conduit in said casing leading to the space enclosed between said diaphragms and maintaining it evacuated, a second suction conduit communicating with a closed space between the larger diaphragm and the casing and having a connection for the machine, and a valve connected to said diaphragms and controlled by their position to open said second space to atmosphere through said second conduit or to exhaust it therethrough, whereby such space is intermittently evacuated and pulsations in the second conduit and connection result.

2. A pulsator for milking machines comprising a pair of rigidly spaced diaphragms of different superficial area located in a casing, the smaller being open to atmosphere at one side, a suction conduit in said casing leading to the space enclosed between said diaphragms and maintaining it evacuated, a second suction conduit communicating with a closed space between the larger diaphragm and the casing and having a connection for the machine, a lever connected to said diaphragms, a valve and a cam surface on said valve engaged by said lever in such manner that during the movement of the diaphragms towards the valve the valve is moved towards them and vice versa, whereby said second space is intermittently evacuated and pulsations in the second conduit and connection result.

3. A pulsator for milking machines comprising a pair of rigidly spaced diaphragms of different superficial area located in a casing, the smaller being open to atmosphere at one side, a suction conduit in said casing leading to the space enclosed between said diaphragms and maintaining it evacuated, a second suction conduit communicating with a closed space between the larger diaphragm and the casing and having a connection for the machine, a lever connected to said diaphragms, a spring pressed roller on the end of said lever, a valve and a cam surface on said valve engaged by said roller in such manner that during the movement of the diaphragms towards the valve the valve is moved towards them and vice versa, whereby said second space is intermittently evacuated and pulsations in the second conduit and connection result.

4. A pulsator for milking machines comprising a pair of rigidly spaced diaphragms of different superficial area located in a casing, the smaller being open at one side to atmosphere, an annular head piece securing said diaphragms in position and forming with the larger diaphragm a closed space, a suction conduit in said casing leading to said closed space and having a connection for the machine, a second suction conduit leading to a second closed space between said diaphragms and maintaining it evacuated, and a valve connected to said diaphragms and controlled by their position to open said first space to atmosphere through said first conduit or to exhaust it therethrough, whereby such space is intermittently evacuated and pulsations in said first conduit and connection result.

5. A pulsator for milking machines comprising a pair of rigidly spaced diaphragms of different superficial area located in a casing, the smaller being open to atmosphere at one side, a suction conduit in said casing leading to the space enclosed between said diaphragms and maintaining such space evacuated, a second suction conduit communicating with a closed space between the larger diaphragm and the casing and having a connection for the machine, a valve and a cam surface on said valve, a lever connected to said diaphragms and spring urged into engagement with said cam surface transmitting movement of the diaphragms to the valve in such manner that said second conduit is intermittently submitted to suction and pulsation in the second conduit and connection produced.

6. A pulsator for milking machines comprising a pair of rigidly spaced diaphragms of different superficial area located in a casing, the smaller being open to atmosphere at one side, a suction conduit in said casing leading to the space enclosed between said diaphragms and maintaining such space evacuated, a second suction conduit communicating with a closed space between the larger diaphragm and the casing and having a connection for the machine, a bridge rigidly spacing said diaphragms and a head on said smaller diaphragm, a lever connected to said head, a spring pressed roller on the end of said lever, a slide valve operating said second conduit and a cam surface on said valve engaged by said roller in such manner that during the movement of the diaphragms towards the valve the valve is moved towards them whereby said second conduit is intermittently evacuated and pulsations in the second conduit and connection result.

7. A pulsator for milking machines, comprising a pair of rigidly spaced diaphragms of different superficial area, suction means maintaining the space between the diaphragms evacuated, a connection from said suction means to the machine, conduits for alternately applying the suction and atmospheric air to the outer face of the larger diaphragm, a valve controlling said conduits, so that when one is open the other is closed, and also said connection, between the suction means and the machine and means operatively connecting the valve to the diaphragms whereby each change in pressure on the larger diaphragm is automatically produced by the last pressure change actuating the valve, whereby the valve automatically interrupts and renews the suction to the machine causing pulsations therein.

8. A pulsator for milking machines comprising a pair of rigidly spaced diaphragms of different superficial area suction means for maintaining the space between them evacuated and for applying the suction to the outer face of the larger diaphragm, a connection between the suction means and the machine, and a valve disposed to interrupt the application of suction to the larger diaphragm and to the machine and formed to admit atmospheric air thereto, said valve being operatively connected to the diaphragms whereby each change of pressure on the larger diaphragm automatically interrupts the suction to the machine so as to cause pulsations therein.

9. A pulsator for milking machines comprising a pair of rigidly spaced diaphragms of different superficial area suction means for maintaining the space between them evacuated, and for applying the suction to the outer face of the larger diaphragm, a pair of connections between the suction means and the machine, and a valve disposed to interrupt the said application of suction to the larger diaphragm, and to the connections to the machine and formed to admit atmospheric air thereto, said valve being operatively connected to the diaphragms whereby each change of pressure on the larger diaphragm automatically interrupts the suction to one of the connections to the machine and admits air through the other so as to cause pulsations in both said connections alternately.

In testimony whereof I affix my signature.

ALEXANDER FREDERICK PLINT.